United States Patent [19]
Widrig et al.

[11] Patent Number: 4,876,825
[45] Date of Patent: Oct. 31, 1989

[54] VEHICLE DOOR

[75] Inventors: Jakob Widrig, Winterthur; Gunther Wulff, Stein am Rhein, both of Switzerland

[73] Assignee: Swiss Aluminium Ltd., Chippis, Switzerland

[21] Appl. No.: 126,709

[22] Filed: Nov. 30, 1987

[30] Foreign Application Priority Data

Dec. 11, 1986 [CH] Switzerland .................. 4944/86

[51] Int. Cl.$^4$ .............................................. B60J 5/04
[52] U.S. Cl. ........................................ 49/502; 49/503
[58] Field of Search ......................... 49/502, 501, 503; 296/202, 146

[56] References Cited

U.S. PATENT DOCUMENTS

| | | | |
|---|---|---|---|
| 4,300,315 | 11/1981 | Holzwarth | 49/502 |
| 4,328,642 | 5/1982 | Presto | 49/502 |
| 4,648,208 | 3/1987 | Baldamus | 49/502 |
| 4,769,951 | 9/1988 | Kaaden | 49/502 |

FOREIGN PATENT DOCUMENTS

| | | | |
|---|---|---|---|
| 0170150 | 2/1986 | European Pat. Off. | 296/146 |
| 3642429 | 6/1988 | Fed. Rep. of Germany | 296/146 |

Primary Examiner—Kenneth J. Dorner
Assistant Examiner—Gerald Anderson
Attorney, Agent, or Firm—Bachman & LaPointe

[57] ABSTRACT

In a vehicle door comprising an outer wall, an inner wall and an equipment carrier which is arranged between the outer and inner walls and, before the outer and inner walls are brought together, can be provided with further door parts, especially a window lifting actuation means, and which serves as a fastening base for at least two door hinges and for at least one door mounted latch arrangement actuable by means of a door lock and interacting with a corresponding frame mounted latch arrangement of the vehicle, and, if appropriate, a window frame, the equipment carrier consists of a bottom boom section with legs directed upwards on one side and at least partially forming a hollow frame, the legs being connected to one another at a distance from the bottom boom section by means of at least one strut.

The bottom boom section and the legs preferably consist of an aluminium alloy casting, in which is partially cast a strut consisting of an aluminium alloy extruded hollow section of boxshaped cross section. A door of this type is light, has high rigidity and can be produced economically.

21 Claims, 2 Drawing Sheets

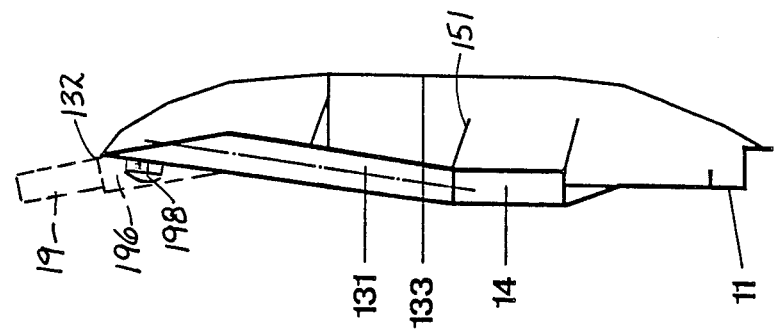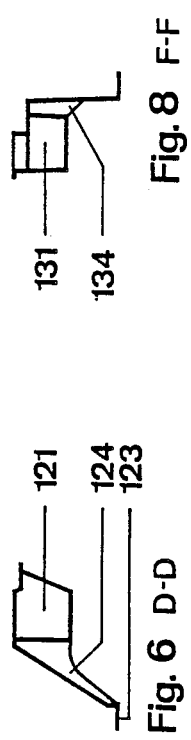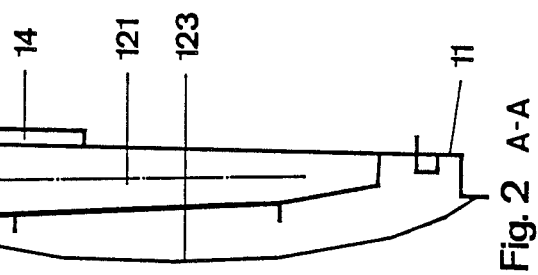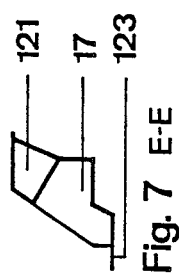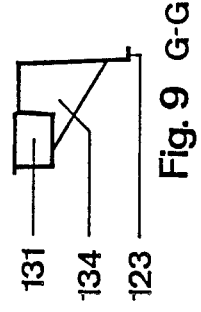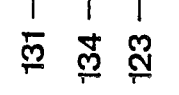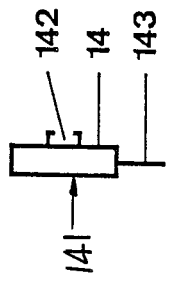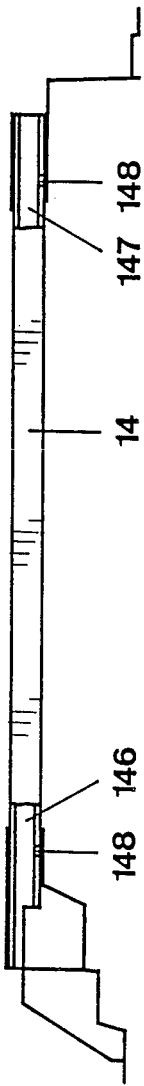

VEHICLE DOOR

BACKGROUND OF THE INVENTION

The present invention relates to a vehicle door comprising an outer waall, an inner wall and an equipment carrier which is arranged between the outer and inner walls and, before the outer and inner walls are brought together, can be provided with further door parts, especially a window lifting actuation means, and which serves as a fasatening base for at least two door hinges and for at least one door mounted latch arrangement nactuablel by means of a door lock and interacting with a corresponding frame mounted latch arrangement of the vehicle. If appropriate, a window frame can also be assigned to the vehicle door. Such a door is hereinafter referred to as of the kind described.

A vehicle door of this type is known from German Offenlegungsschrift 3,402,135. The equipment carrier is in the form of a carrier plate which is part ofo a stiffening box, to which the outer wall and the inner wall can be attached. Although a carrier plate of this type makes it possible for builtin equipment parts to be largely preassembled, complex process steps involving a high outlay are necessary in order to produce the carrier plate and, in particular, the associated stiffening box.

The object of the present invention is to proide a vehicle door of the kind described, in which the equipment carrier, whilst having high rigidity and effective protection against collision forces, can be produced simply and consequently under economically favourable conditions, that is to say in a cost saving way. A broader object will be to make the equipment carrier sa light as possible as the result of an appropriate choice of the material and its use, and to combine with one another further door parts, such as, for example, a window frame or parts of this, or at least make it possible to assemble them in a simple way.

SUMMARY OF THE INVENTION

According to the invention, in a vehicle door of the kind described, the equipment carrier consists of a bottom boom section with legs directed upwards on respective sides and each at least partially forming a hollow frame, and the legs being connected to one another at a distance from the bottom boom section by means of at least one strut.

BRIEF DESCRIPTION OF THE DRAWINGS

Further advantageous features and details of the invention emerge from the accompanying drawings, in which:

FIGS. 2 to 9 show different sections through the equipment carrier according to FIG. 1.

DETAILED DESCRIPTION

Figure 1:
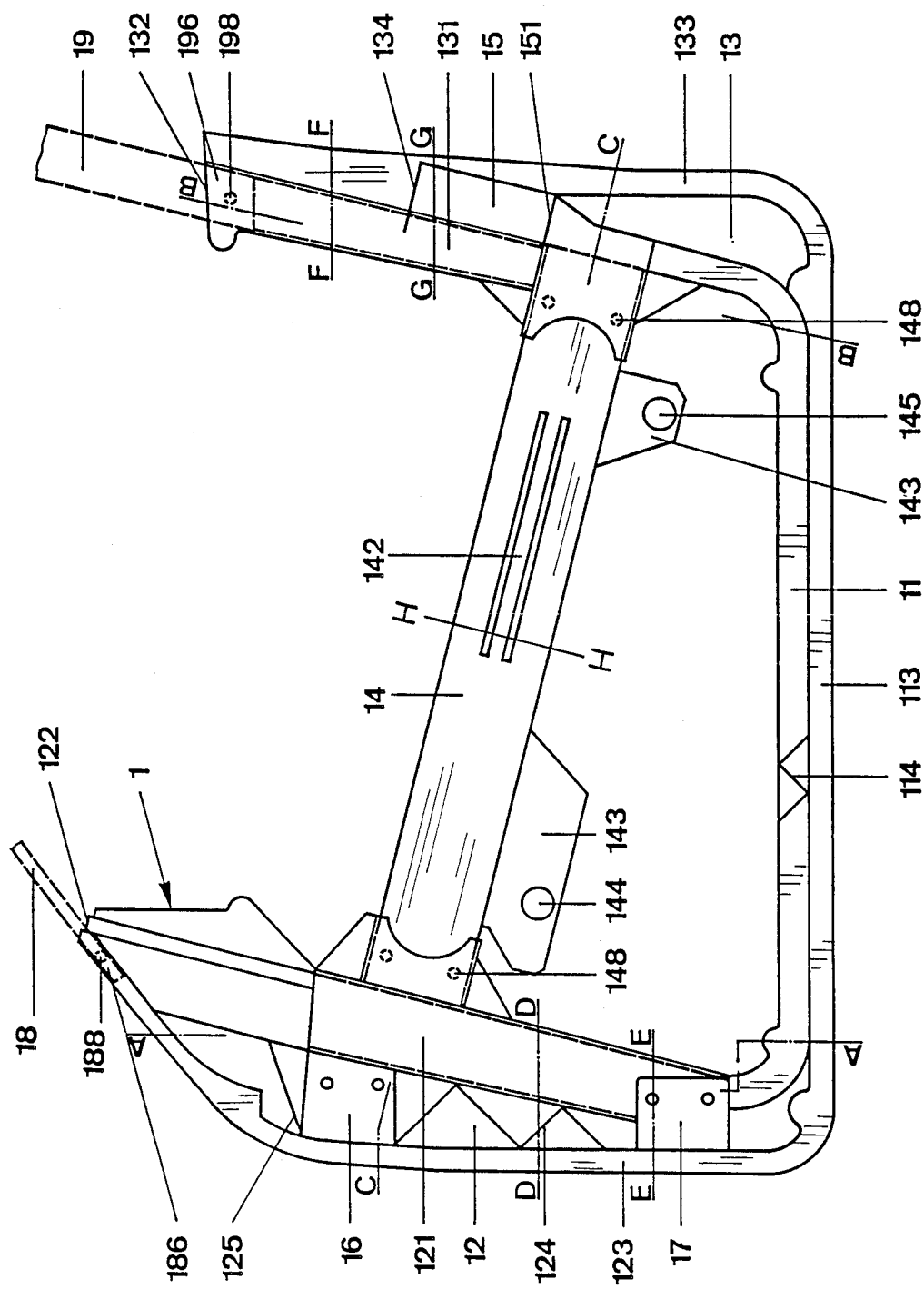
FIG. 1 shows an elevation view of an equipment carrier.

The equipment carrier 1 consists essentially of a bottom boom section 11, on which are arranged directed upwards on one side legs 12 and 13 which each have aat least one hollow frame 121, 131, the legs 12, 13 being connected to one another at a distance from the bottom boom section by means of one or more struts 14. Advantageously, the strut 14 is designed as a hollow section 141, preferably as a boxshaped hollow section.

It has proved advantageous to arrange the longitudinal axes of the hollow frames 121, 131 approximately parallel to one another. If the legs 12,13 extend obliquely relatively to the bottom boom 11, an N-shaped or Z-shaped relative arrangement is obtained. However, the longitudinal axes of the hollow frames 121,131 of the legs 12,13 can also be at right angles to the bottom boom 11, so that, with the strut arranged obliquely relative to this, an N-shaped or Z-shaped arrangment of the parts 12,13,14 is obtained once again. But it is especially advantageous if the strut 14 is connected to the legs 12,13 at right angles to the longitudinal axes of the hollow frames 121,131, since then the forces taking effect through or, as the case may be, on, the door, for example in the event of an accident, are transmitted or introduced to the body especially uniformly via the hinges and the lock, because these stopping points are connected operatively to one another via the N-shaped or Z-shaped carcass (H-shaped carcass if the legs 12,13 are arranged at right angles to the bottom boom 11).

The connetions between the strut 14 and the legs 12,13 are especially important. In principle, the connections can be made by means of conventional measures, such as screwing, riveting, welding, etc. To achieve a particularly high rigidity of the equpment carrier 1, it has proved beneficial to make the connection between the strut 14 and the legs 12,13 by partially casting it in the legs during the production of these. Furthermore, it is especially favourable, in this respect, if the bottom boom 11 and the legs 12,13 are in one piece. This is particularly advantageous, especially when aluminium alloy materials are used for producing the legs 12,13 and/or the strut 14. It is thus possible to manufacture more simply and more economically in process terms a vehicle door in which the bottom boom section 11 and the legs 12,13 ar produced from a casting and the strut 14 is cast into this casting during the time when the latter is produced. In this case, the strut 14 advantageously consists of an extruded section, especially of a hollow section 141 of a boxshaped cross section. To improve such a connection even further, the strut 14 contains, at each connection point, at least one recess 148 which is filled with metal as a result of the casting process.

The rigidity of the equipment carrier 1 and consequently the rigidity of the door is further increased if the strut 14 passes at least partially through the two legs 12,13 thereby engaging at least partially positively behind one leg part forming the hollow frame 121, and catching positively under the other leg part forming the hollow frame 131. At the same time, the end 136 of the strut 14 which catches under the leg part forming the hollow frame 131 can project beyond the hollow frame 131 nd simulaneously form the base surface 151 for a lock chamber 15 incorporated in the leg 13.

For the handling, design and assembly of the vehicle door according to the invention, it haas also proved particularly expedient for the leg 12, together with the leg part behind which the strut 14 engages, to have at least two hinge chambers 16,17, and for at least one hinge chamber 17 to be incorporated at least partially in the hollow frame 121.

The advantageous embodiment of the invention also includes providing the bottom boom section 11 and the legs 12,13 with flanges, for example flanges 113, 123,133, and/or grooves (not shown for the sake of clarity) which are designed as bearing surfaces or guides for further door parts, especially for the outer wall, inner wall, seals and cables. The flanges 113, 123,133 can be reinforced by ribs 114,124,125,134,135 or by means having a similar effect.

The strut 14 can have at least one slot 142 for receiving door parts, especially the window lifing mechanism, and/or least one web 143 for providing positioning points 144,145. The positioning points 144,145 as fixed points for machining make it much easier to produce the door, especially by means of automatic machines.

The ends 122,132 of the legs 12,13 can also, at the same time, at least partially form the window frame section 18,19. It is also possible, however, to design the ends 122,132 of the legs 12,13 in such a way that they serve for receiving an appropriately matched window frame section 18,19. At the same time, the ends 122,132 could be parts of plug connections.

However, it is especially advantageous to make the connection between the window frame section 18,19 and the legs 12,13 in a similar way to the connection between the legs 12,13 and the strut 14 by partially casting the ends 186,196 of the window frame section 18,19 in to the legs 12,13 during the production of these. Once again, such a connection can be additionally reinforced by filling a recess 188,198 with metal at the ends 186,196 of the window frame section 18,19.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

we claim:

1. A vehicle door comprising: and outer wall, an inner wall and a single equipment carrier onto which all other door parts are arranged positioned between said outer and inner walls; said equipment carrier having a high degree of rigidity and providing effective protection against collision forces; said equipment carrier serving as a fastening base for at least two door hinges and for at least one door mounted latch arrangement; and said equipment carrier consisting of a bottom boom section having two legs directed upwards, each said leg being positioned at an end of said bottom boom section and being at least partially formed by a hollow frame, said boom section and legs consisting of a casting, at least one strut formed by an extruded section connecting said legs to one another at a distance from the bottom boom section; and said at least one strut being connected to said legs by having been partially cast thereto in order to provide said high degree of rigidity.

2. A vehicle door according to claim 1 wherein said at least one strut has at least one recess at each of its ends.

3. The vehicle door according to claim 1 wherein said at least one strut is designed as a hollow section.

4. A vehicle door according to claim 3 wherein said hollow section has a box shaped cross section.

5. A vehicle door according to claim 1 wherein said at least one strut is an aluminum alloy extruded section.

6. A vehicle door according to claim 1 wherein longitudinal axes of said hollow frames are arranged at right angles to said bottom boom section.

7. A vehiclel door according to claim 1 wherein longitudinal axes of said hollow frames are arranged substantially parallel to one another.

8. A vehicle door according to claim 1 wherein said at least one strut is arranged substantially at right angles to longitudinal axes of said hollow frames.

9. A vehicle door according to claim 1 wherein said bottom boom section and said legs are provided with at least one of flanges and grooves designed as bearing surfaces or guides for said further door parts.

10. A vehicle door according to claim 9 wherein said flanges are reinforced by ribs.

11. A vehicle door according to claim 1 wherein said at least one strut has at least one slot for receiving door parts.

12. A vehicle door according to claim 1 wherein said at least one strut has at least one web for providing positioning points. useful in producing said door.

13. A vehicle door according to claim 1 wherein each of said legs has an end which at least partially forms a window frame section.

14. A vehicle door according to claim 1 wherein each of said legs has an end which receives an appropriately matched window frame section.

15. A vehicle door according to claim 14 wherein said leg ends are parts of plug connectins.

16. A vehicle door accordign to claim 14 wherein said window frame section is connected to said legs by having ends of said window frame section partially cast into said legs during production thereof.

17. A vehicle door according to claim 16 wherein said window frame section ends each have at least one recess.

18. A vehicle door comprising: and outer wall, an inner wall and an equipment carrier positioned between said outer and inner wall; said equipment carrier being provided with further door parts and serving as a fastening base for at least two door hinges and for at leasat one door mounted latch arrangment; and said equipment carrier consisting of a bottom boom section having two legs directed upwards, each said leg being positioned at one end of said bottom boom section and being at least partially formed by a hollow frame, at least one strut connecting said legs to one another at a distance from the bottom boom section, and said at least one strut passing at least partially through each of said legs so as to least partially positively engage a portion of the hollow frame of one of said legs and so as to positively catch a part of the hollow frame associated with a second one of said legs.

19. A vehicle door according to claim 18 wherein said one leg together with its hollow frame part has at least two hinge chambers with at least one of said hinge chambers being at least partially incorporated in said hollow frame associated with said one leg.

20. A vehicle door according to claim 18 wherein an end part of said at least one part projects beyond said hollow frame associated with said second one of said legs so as to form a base surface for a lock chamber incorporated in said second one of said legs.

21. A vehicle door according to claim 20 wherein said one leg together with said hollow frame part thereof has at least two hinge chambers with at least one of said hinge chambers being incorporated at least partially in said hollow farme.

* * * * *

UNITED STATES PATENT AND TRADEMARK OFFICE
CERTIFICATE OF CORRECTION

Page 1 of 2

PATENT NO. : 4,876,825
DATED : OCTOBER 31, 1989
INVENTOR(S) : JAKOB WIDRIG ET AL.

It is certified that error appears in the above-identified patent and that said Letters Patent is hereby corrected as shown below:

IN COLUMN 1, LINE 6, CHANGE "WAALL" (FIRST OCCURRENCE) TO --WALL--.

IN COLUMN 1, LINE 11, CHANGE "FASATENING" TO --FASTENING--.

IN COLUMN 1, LINE 13, CHANGE "NACTUABLEL" TO --ACTUABLE--.

IN COLUMN 1, LINE 20, CHANGE "OFO" TO --OF--.

IN COLUMN 1, LINE 27, CHANGE "PROIDE" TO --PROVIDE--.

IN COLUMN 1, LINE 33, CHANGE "SA" TO --AS--.

IN COLUMN 1, LINE 62, CHANGE "AAT" TO --AT--.

IN COLUMN 2, LINE 8, CHANGE "ARRANGMENT" TO --ARRANGEMENT--.

IN COLUMN 2, LINE 20, CHANGE "CONNETIONS" TO --CONNECTIONS--.

IN COLUMN 2, LINE 24, CHANGE "EQUPMENT" TO --EQUIPMENT--.

IN COLUMN 2, LINE 35, CHANGE "AR" TO --ARE--.

IN COLUMN 2, LINE 53, CHANGE "ND" TO --AND--.

IN COLUMN 2, LINE 53, CHANGE "SIMULANEOUSLY" TO SIMULTANEOUSLY--.

IN COLUMN 2, LINE 56, CHANGE "HAAS" TO --HAS--.

UNITED STATES PATENT AND TRADEMARK OFFICE
CERTIFICATE OF CORRECTION

PATENT NO. : 4,876,825
DATED : OCTOBER 31, 1989
INVENTOR(S) : JAKOB WIDRIG ET AL.

It is certified that error appears in the above-identified patent and that said Letters Patent is hereby corrected as shown below:

IN COLUMN 3, LINE 6, BETWEEN "OR" AND "LEAST" INSERT --AT--.

IN COLUMN 4, LINE 26, CHANGE "CONNECTINS" TO --CONNECTIONS--.

IN COLUMN 4, LINE 27, CHANGE "ACCORDIGN" TO --ACCORDING--.

IN COLUMN 4, LINE 34, CHANGE "AND" TO --AN--.
IN COLUMN 4, LINE 38, CHANGE "LEASAT" TO --LEAST--.
IN COLUMN 4, LINE 39, CHANGE "ARRANGMENT" TO --ARRANGEMENT--.

IN COLUMN 4, LINE 42, CHANGE "ONE" TO --AN--.

IN COLUMN 4, LINE 47, BETWEEN "TO" AND "LEAST" INSERT --AT--.

IN COLUMN 4, LINE 65 CHANGE "FARME" TO --FRAME--.

Signed and Sealed this

Thirty-first Day of March, 1992

Attest:

HARRY F. MANBECK, JR.

*Attesting Officer*  *Commissioner of Patents and Trademarks*